United States Patent [19]
Morlion et al.

[11] Patent Number: 5,898,808
[45] Date of Patent: Apr. 27, 1999

[54] MULTIFIBRE CONNECTOR PLUG

[75] Inventors: Danny Morlion, St. Amandsberg; Jan Peter Karel Van Koetsem, Zwijndrecht, both of Belgium

[73] Assignee: Framatome Connectors International, Courbevoie, France

[21] Appl. No.: 08/837,780

[22] Filed: Apr. 22, 1997

[30] Foreign Application Priority Data

Apr. 26, 1996 [NL] Netherlands ............................ 1002955

[51] Int. Cl.$^6$ ...................................................... G02B 6/36
[52] U.S. Cl. .............................. 385/77; 385/59; 385/70; 385/86
[58] Field of Search ................................. 385/58, 59, 62, 385/71, 75, 77, 81, 70, 54–56, 90, 86

[56] References Cited

U.S. PATENT DOCUMENTS

| | | | |
|---|---|---|---|
| 4,697,871 | 10/1987 | Cook | 385/72 |
| 4,759,599 | 7/1988 | Yamaguchi et al. | 385/60 |
| 5,373,574 | 12/1994 | Marazzi | 385/78 |
| 5,748,818 | 5/1998 | Weiss et al. | 385/65 |

FOREIGN PATENT DOCUMENTS 2062891  5/1981  United Kingdom.

*Primary Examiner*—Hemang Sanghavi
*Attorney, Agent, or Firm*—Perman & Green, LLP

[57] ABSTRACT

A multifibre connector plug (1) comprises a connector plug part (6) for receiving a plurality of optical fibres (2), a coupling body (10) and a coupling sleeve (19). The connector plug part is provided with a contact face (7) at one end and is slidable in the coupling body. The connector plug part projects out of the coupling body with its end having the contact face. The coupling sleeve (19) encloses the coupling body and is slidable on this coupling body from a coupling position into a decoupling position against the action of a spring means (21). The spring means (21) comprises at least one spring (21) being an integrated unitary part of the coupling sleeve (19) and a free end (22) of the spring means engaging a corresponding support shoulder (23) of the coupling body (10).

8 Claims, 3 Drawing Sheets

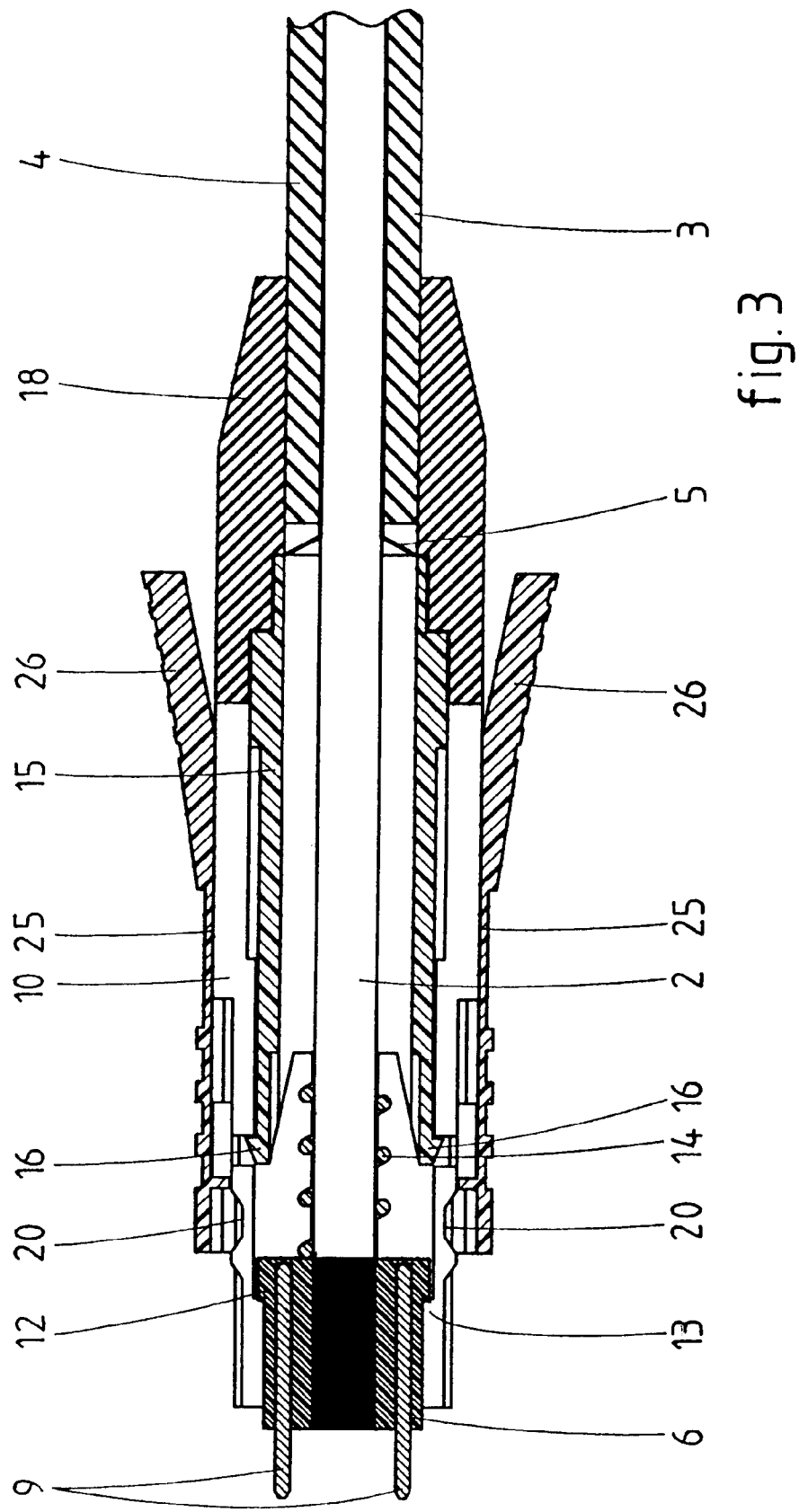

MULTIFIBRE CONNECTOR PLUG

BACKGROUND OF THE INVENTION

The invention relates to a multifibre connector plug, comprising a connector plug part for receiving a plurality of optical fibres, said connector plug part having a contact face at one end, a coupling body, the connector plug part being slidable in said coupling body, wherein the connector plug part projects out of said coupling body with its end having said contact face, and a coupling sleeve enclosing said coupling body and being slidable on said coupling body from a coupling position into a decoupling position against the action of a spring means.

In the known connector plug of this type the spring means comprises separate spring elements making the assembly of the connector plug rather complicated.

SUMMARY OF THE INVENTION

It is an object of the invention to provide an improved multifibre connector plug of the above-mentioned type.

To achieve this object said spring means in the connector plug of the invention comprises at least one spring being an integrated unitary part of the coupling sleeve and engaging with a free end a corresponding support shoulder of the coupling body.

In this manner a simplified connector plug is obtained, wherein for the assembly of coupling body, coupling sleeve and spring means it is only necessary to push the coupling sleeve on the coupling body. Mounting separate springs is not required anymore so that manufacturing cost can be decreased.

According to a favourable embodiment the coupling sleeve with the spring means is made of plastic material, wherein the spring means is unloaded in the coupling position.

BRIEF DESCRIPTION OF THE DRAWINGS

The invention will be further explained by reference to the drawings in which an embodiment of the connector plug according to the invention is schematically shown.

FIG. 3 shows an axial cross-section of the connector plug of FIG. 1 with an optical fibre cable connected thereto.

DETAILED DESCRIPTION OF THE PREFERRED EMBODIMENT

Figure 1:
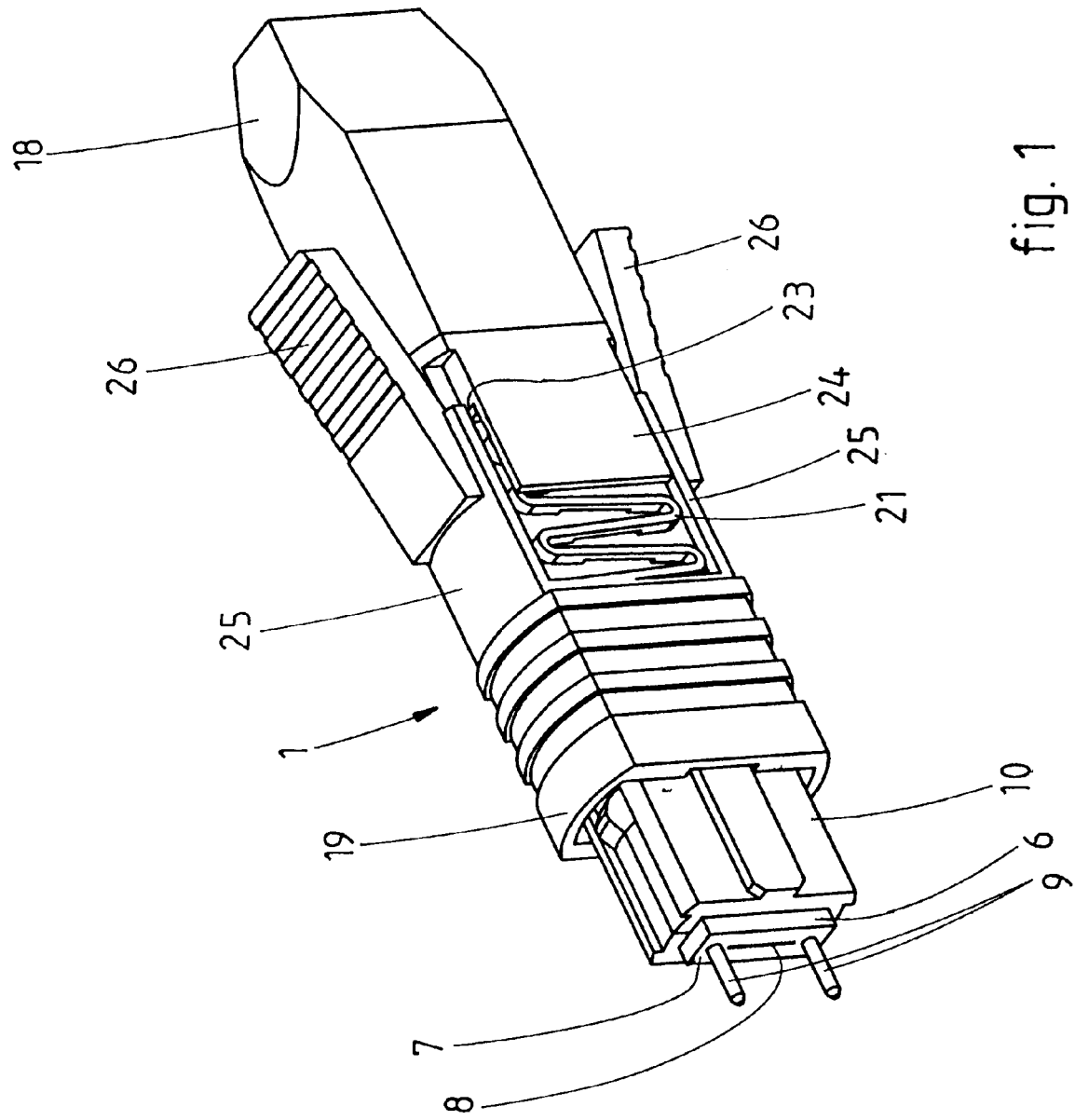
FIG. 1 shows a perspective view of an embodiment of the multifibre connector plug of the invention, wherein for clarity sake the optical fibre cable is not shown.
Figure 2:
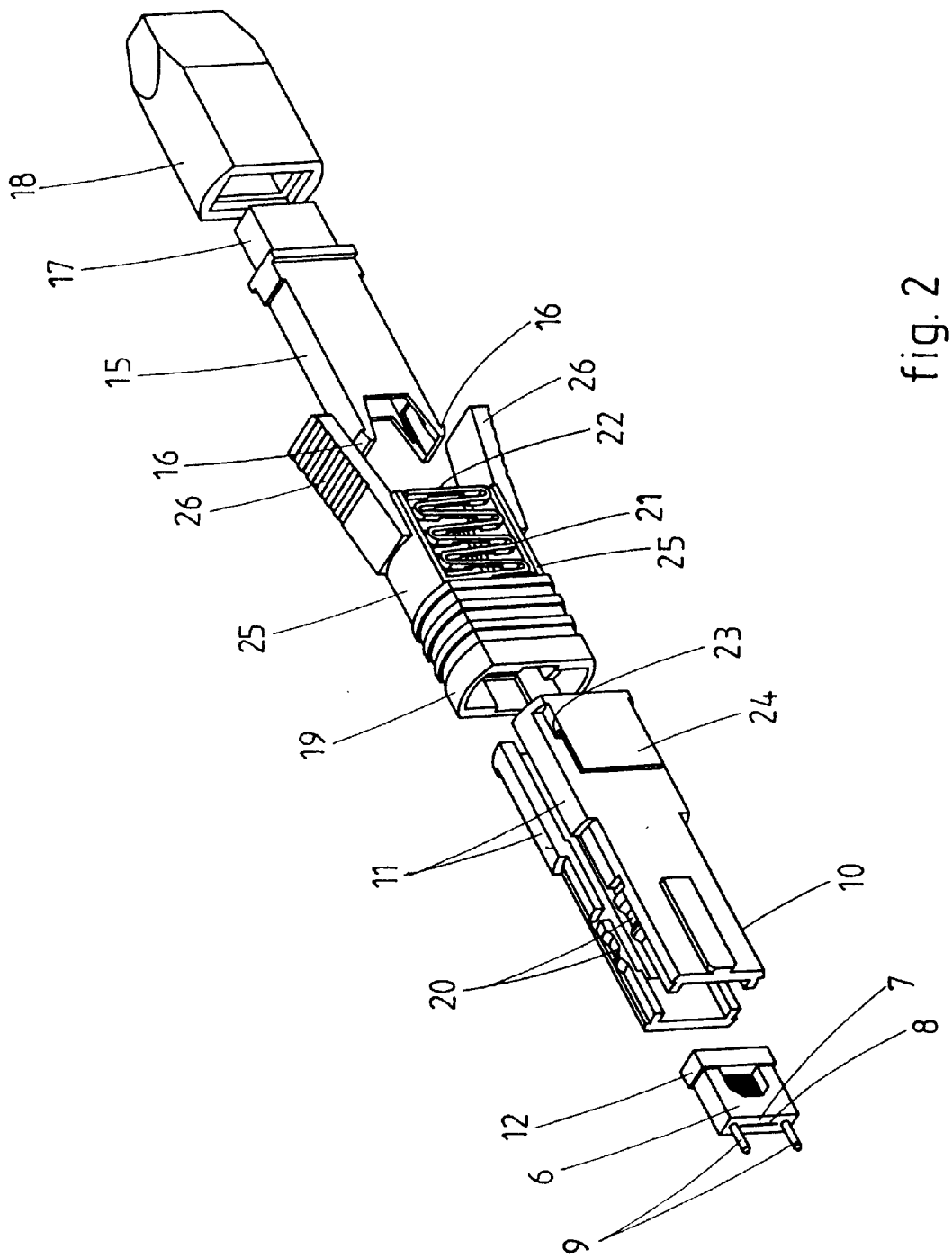
FIG. 2 shows an exploded view of the connector plug of FIG. 1.

Referring to the drawings there is shown a multi-fibre connector plug 1 which in a manner known per se can be coupled with a corresponding connector plug for interconnecting a plurality of optical fibres. The optical fibres of the connector plug 1 are schematically indicated at 2 in FIG. 3 and are part of an optical fibre cable 3 with an outer jacket 4 and a schematically indicated reinforcement jacket 5 usually made of Kevlar fibres.

The connector plug 1 is provided with a connector plug part 6, in which the uncovered optical fibres 2 are attached. This connector plug part 6 is also indicated as ferrule.

The connector plug part 6 has a contact face 7, the optical fibres 2 ending in said contact face as indicated by reference numeral 8. Further the connector plug part 6 comprises two holes debauching in the contact face 7 at both sides of the ends of the optical fibres 2, wherein in this case guiding pins 9 are mounted in said holes. The pins 9 will be received in the holes of a corresponding connector plug part if the connector plug 1 is coupled with a corresponding connector plug 1.

The connector plug part 6 is slidably received within a coupling body 10 assembled of two identical halves 11, wherein the connector plug part 6 projects out of the coupling body 10 with its end having the contact face 7. As shown in FIG. 3, the connector plug part 6 is pressed with an edge 12 against an inner edge 13 of the coupling body 10 by a spring 14. This spring 14 is lying between the connector plug part 6 and a carrier sleeve 15 fixed within the coupling body 10 by means of two locking fingers 16.

The carrier sleeve 15 has a mounting surface 17 at its end opposite of the coupling body 10, the reinforcement jacket 5 of the optical cable 3 being attached to said 15 mounting surface 17, for example by glueing.

Finally, the connector plug 1 is closed by an end sleeve or boot 18 attached to the end of the carrier sleeve projecting out of the coupling body 10. The end sleeve 18 encloses the reinforcement jacket 5 of the optical cable 3.

The connector plug 1 further comprises a coupling sleeve 19 enclosing the coupling body 10 and being slidable on this coupling body 10 from a coupling position shown in FIGS. 1 and 3 into a withdrawn decoupling position not shown. In the coupling position the coupling sleeve 19 encloses two recesses 20 provided in opposite sides of the coupling body 10. In a manner known per se locking fingers of a backpanel adapter, for example can engage into said recesses for holding the connector plug 1 in the adapter. Decoupling the connector plug 1 is possible by sliding the coupling sleeve 19 into the withdrawn decoupling position against the action of a spring means which after releasing the coupling sleeve 19 moves this coupling sleeve back into the coupling position.

In the connector plug 1 shown the spring means comprises two springs 21 which are integrated parts of the coupling sleeve 19 and form a single unit therewith. In the embodiment shown the coupling body 10 and the coupling sleeve 19 have a mainly rectangular cross-section, wherein the springs 21 are located at the two opposite long rectangular sides and join the end of the coupling sleeve 19 directed away from the connector plug part 6.

The coupling sleeve 19 and the springs 21 are made unitary of plastic material, wherein the springs 21 are unloaded in the coupling position shown in the drawings. The springs 21 are made as a substantially sine-shaped material strip joining the material of the coupling sleeve 19. The free end of the springs 21 is formed as a straight support section 22 engaging a corresponding support shoulder 23 of the coupling body 10. Each support shoulder 23 further carries a cover lip 24 at least substantially covering the corresponding spring 21 whereby damage of the springs 21 is avoided.

To protect the springs the coupling sleeve 19 carries on both other opposite sides lips 25 extending from the coupling sleeve 19 along an equal length as the springs 21.

As the springs 21 are made unitary with the coupling sleeve 19, the assembly of the coupling sleeve 19 and the coupling body 10 is a rather simple action, wherein the springs 21 are automatically lying at the correct location.

Further, it will be clear from the above that the connector plug 1 comprises a relatively low number of parts, wherein mounting of the optical cable 3 is simplified in that the coupling body 10 consists of two halves 11 which can be simply mounted around the cable 3.

The invention is not restricted to the above described embodiment which can be varied in a number of ways within the scope of the claims. In the connector plug 1 described the lips 25 are for example provided with operating lips 26 extending obliquely outwardly in the direction of the end sleeve 18. These operating lips 26 facilitate the movement of the coupling sleeve 19 from the coupling position into the decoupling position.

What is claimed is:

1. A multifibre connector plug, comprising a connector plug part for receiving a plurality of optical fibres, said connector plug part having a contact face at one end, a coupling body, the connector plug part being slidable in said coupling body, wherein the connector plug part projects out of said coupling body with its end having said contact face, and a coupling sleeve enclosing said coupling body and being slidable on said coupling body from a coupling position into a decoupling position against the action of a spring means, said spring means comprising at least one spring being an integrated unitary part of the coupling sleeve and a free end of the spring means engaging a corresponding support shoulder of the coupling body.

2. A connector plug according to claim 1, wherein the coupling sleeve with the spring means is made of plastic material and wherein the spring means is unloaded in the coupling position.

3. A connector plug according to claim 1, wherein each spring of the coupling sleeve is a substantially sine-shaped material strip joining at one side the coupling sleeve and at the other side terminating in a straight support section abutting against the support shoulder of the coupling body.

4. A connector plug according to claim 1, wherein each support shoulder of the coupling body carries a lip at least substantially covering the corresponding spring.

5. A connector plug according to claim 1, wherein the coupling body and the coupling sleeve each have a substantially rectangular cross-section, wherein the coupling sleeve at one end carries an integrated spring at two opposite sides and integrated lips at both other opposite sides, said lips extending along the same length from the coupling sleeve as the springs.

6. A connector plug according to claim 5, wherein the lips carry obliquely outwardly extending operating lips.

7. Connector plug according to claim 1, wherein the coupling body comprises two identical halves.

8. Connector plug according to claim 1, wherein a carrier sleeve is fixed in the coupling body at the end opposite the connector plug part, said carrier sleeve at the end directed away from the coupling body having a mounting surface for a reinforcement jacket of an optical cable comprising said optical fibres, wherein a boot is fixed on said end of the carrier sleeve while clamping the reinforcement jacket.

\* \* \* \* \*